F. WUNSCH.
ELECTRICAL MEASURING APPARATUS.
APPLICATION FILED AUG. 11, 1915.

1,209,372.

Patented Dec. 19, 1916.

Inventor
Felix Wunsch

By Cornelius D. Ehret
His Attorney

UNITED STATES PATENT OFFICE.

FELIX WUNSCH, OF PHILADELPHIA, PENNSYLVANIA, ASSIGNOR TO THE LEEDS & NORTHRUP COMPANY, OF PHILADELPHIA, PENNSYLVANIA, A CORPORATION OF PENNSYLVANIA.

ELECTRICAL MEASURING APPARATUS.

1,209,372.   Specification of Letters Patent.   Patented Dec. 19, 1916.

Original application filed March 4, 1915, Serial No. 11,945. Divided and this application filed August 11, 1915. Serial No. 44,852.

*To all whom it may concern:*

Be it known that I, FELIX WUNSCH, a citizen of the United States, residing in the city of Philadelphia, county of Philadelphia, and State of Pennsylvania, have invented a new and useful Electrical Measuring Apparatus, of which the following is a specification.

My invention relates to electrical measuring apparatus involving a thermo-electric couple suitable for temperature measurements or pyrometry and other purposes.

My invention resides in thermo-electric measuring apparatus including means for automatically correcting or compensating for variations in temperature of one of the junctions of a thermo-couple.

My invention resides in apparatus of the character hereinafter described and defined in the claims.

For an illustration of some of many forms my invention may take reference is to be had to the accompanying drawings, in which.

In thermo-couple pyrometry the temperature readings are based upon the fact that there is generated by the thermo-couple an electro-motive-force which is a function of the difference between the temperatures of the hot and cold junctions of the thermo-couple. In most cases it is the temperature existing at one of the junctions and not the difference between the temperatures of the junctions of the couple which is the unknown quantity to be measured. It is accordingly necessary either to maintain one of the junctions at a constant known temperature, or, if this is not done, to apply a correction for the variation in temperature of such junction of the couple from a given temperature. And it is to means for making such correction that my invention relates, more particularly when the measuring instrument is a split circuit potentiometer, to the end that the scale readings of the indicating or measuring apparatus will directly give, notwithstanding variations in the temperature of one of the thermo-couple junctions, the unknown temperature of the other junction, without recourse to computation, tables, calibration curves or the like.

The electro-motive force generated by a thermo-couple is a function not only of the difference between the temperatures of its two junctions but varies also with the absolute temperatures of its junctions. Thus the electro-motive-force generated by a thermo-couple for a temperature difference of 100 degrees between its two junctions, one of which is at 0 degrees and the other at 100 degrees, is, generally speaking, quite different in value from the electro-motive-force generated by the same couple when there is a temperature difference of 100 degrees between its two junctions when one junction is at 900 degrees and the other is at 1000 degrees. From this fact it is impossible, with most thermo-couples, to make a true or accurate correction simply by changing the reading of the instrument by an amount corresponding with the temperature variation of one junction from the temperature at which that junction was maintained during calibration of the thermo-couple.

Figure 1:
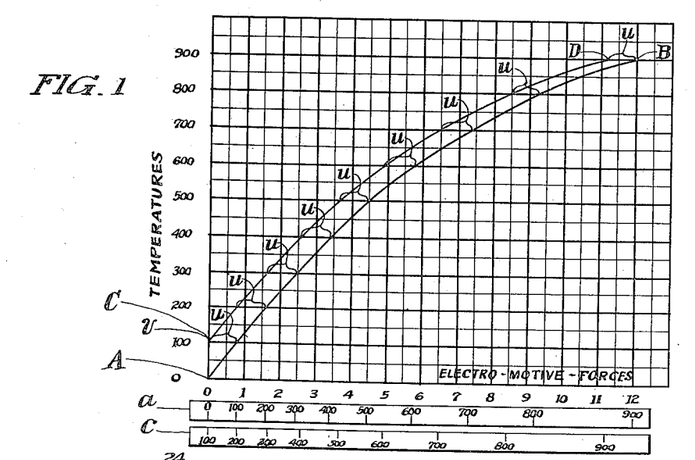
Figure 1 is a graphic representation of relations existing between temperatures and electro-motive-forces of a thermo-couple, together with derivatives from such relations.

The characteristics of a thermo-couple which are important here may be stated as follows: Assuming any three temperatures, $x$, $y$ and $z$, $y$ being higher than $x$, and $z$ being higher than $y$, and subjecting one junction of a thermo-couple to a temperature $x$, and the other to a temperature $z$, and then increasing the temperature of the first junction from temperature $x$ to temperature $y$, the electro-motive-force generated by the thermo-couple in the latter case will be decreased from the value of the electro-motive-force produced by it when one junction is at temperature $x$ and the other at temperature $z$ by a value of electro-motive-force which the same thermo-couple would generate if its one junction were at temperature $x$ and the other at temperature $y$. The thermo-couple is usually calibrated by maintaining one of its junctions at a known low temperature and by measuring directly or indirectly the electro-motive-forces generated by the couple when its other junction is at various known higher temperatures. In Fig. 1 the curve A, B represents a calibration curve whose abscissæ are electro-motive-forces and whose ordinates are temperatures, the cold junction being maintained at 0 degrees temperature and the hot junction being carried up to a temperature of 900 degrees. Below the curve is a scale $a$, reading in temperatures, for a reading instrument of a character whose indications are proportional to the electro-motive-forces, when used in connection with the thermo-couple whose calibration curve is A, B. The markings 100, 200–900 of this scale are found by projecting downwardly from the points of intersection between the curve A, B and the horizontal lines opposite the temperatures 100, 200–900 of the curve sheet.

Taking into consideration now the above described characteristic of thermo-couples a derived curve C, D, may be plotted for the same thermo-couple with its cold junction at any other than 0 degrees temperature, in this case 100 degrees. This curve is derived as follows: On the horizontal line opposite the temperature 100 degrees there is measured to the left, from the point where the curve A, B intersects that line, a distance equal to the electro-motive-force generated by the couple when its hot junction is at 100 degrees shown by curve A, B. Accordingly the first point on the curve C, D is at 0 electro-motive-force and on the horizontal line corresponding to 100 degrees. At each of the other temperatures exactly the same distance is measured off to the left from the curve A, B and through these points the curve C, D is drawn. In other words, the distance from point $v$ to point $w$ corresponds with the electro-motive-force generated by the couple when its one junction is at 0 degrees and its other junction is at 100 degrees. This distance $u$ is measured off to the left of curve A, B on the horizontal lines of the curve sheet and the curve C, D then drawn through these derived points. Below the curve sheet is the corresponding scale $c$, reading in temperatures, derived from the curve C, D in the manner in which the scale $a$ was derived from curve A, B for the same proportionally reading or indicating instrument; that is, by projecting downwardly from the points of intersection of the curve C, D and the horizontal lines opposite the temperature 100, 200–900 of the curve sheet.

Throughout the following description and claims there will be used for brevity and simplicity terms as follows: The temperature to be measured and the junction of the thermo-couple subjected to that temperature will be known as the "unknown temperature" and "hot junction", respectively, whether that junction be at higher, same or lower temperature than the temperature of the other junction; the constant known temperature and the other junction subjected to that temperature during calibration of the thermo-couple will be known as the "calibration temperature" and "cold junction", respectively, whether that junction be at lower, same or higher temperature than the hot junction; and the known temperature to which said cold junction may be varied when a measurement is made will be known as the "reference temperature".

From the foregoing it will be understood that where the "reference temperature" differs from the "calibration temperature" the electro-motive-force reading is corrected by adding or subtracting the electro-motive-force which would be produced by the thermo-couple when one junction is at the "calibration temperature" and the other junction at the "reference temperature". And it will be further noted that there is no direct arithmetical relation between the temperature variations of the cold junction and the corrections to be applied to the temperature readings.

Figures 2, 3, 4, 5, 6, 7, 8:
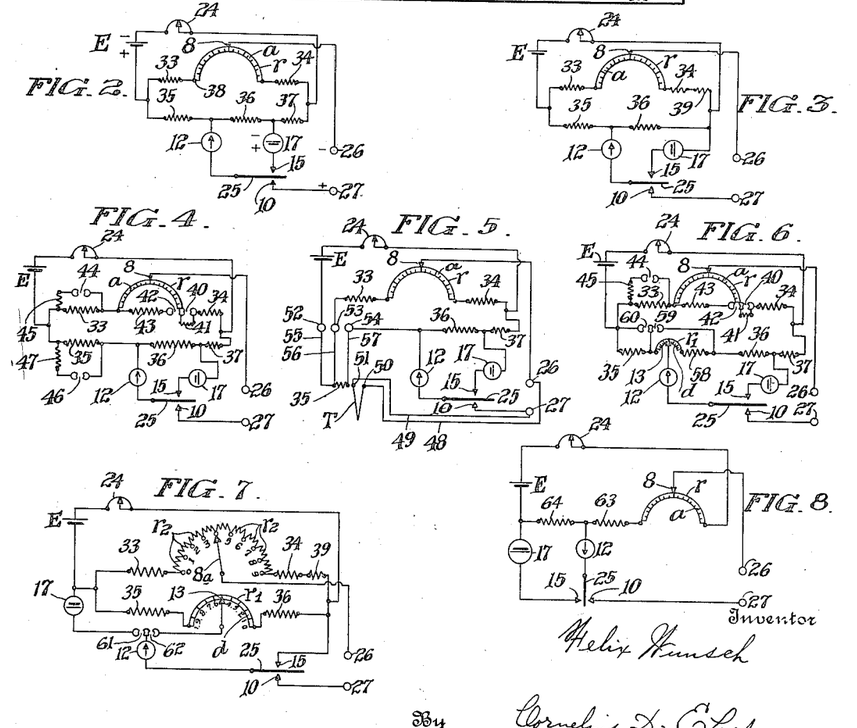
Fig. 2 is an elemental diagram of a single range instrument involving a split potentiometer circuit employing means for automatically correcting for variations in cold junction temperature.
Fig. 3 is an instrument similar to that indicated in Fig. 2, but employing further correction or compensation means.
Fig. 4 is an elemental diagram of a double range instrument involving means for automatically correcting for temperature variations of the cold junctions for both ranges.
Fig. 5 is an elemental diagram of an instrument for automatically correcting for variations in temperature of the cold junctions of a thermo-couple when the cold junction is located at a distance from the instrument.
Fig. 6 is an elemental diagram of a double range instrument in which for one range automatic means are provided and for the other range manually operated means are provided for correcting for variations in temperatures of the cold junctions.
Fig. 7 is an elemental diagram of an instrument having means for automatically compensating for variations in temperature of the cold junction and in which the standard cell is differently employed and approximate balance procured by stepped resistance in one branch and final balance by a slide wire in another branch.
Fig. 8 is an elemental diagram of an instrument involving a simple potentiometer with means for automatically compensating or correcting for variations in temperature of the cold junction.

In Figs. 2 to 8 inclusive are disclosed various arrangements in which the correction or compensation for variations in temperature of the cold junction is accomplished automatically by employing in certain relations resistances of suitable values and suitable temperature co-efficients. In Fig. 2 the slide wire $r$ and resistances 33 and 34 constitute one branch of a potentiometer and are connected in circuit with the rheostat 24 and the source of current E. The contact 8 movable in contact with and along the slide wire $r$ connects as before with binding post 26 to which one terminal of the thermo-junction is connected. In shunt to the resistances 33, $r$ and 34 of the first branch are the serially connected resistances 35, 36 and 37 constituting the second branch. One terminal of the galvanometer 12 is connected between the resistances 35 and 36 and the other terminal to the key 25 which in one position engages contact 10 connected to the binding post 27 with which the other terminal of the thermo-junction is connected, and in its other position engages the contact 15 connected to one terminal of the standard cell 17, whose other terminal is connected between the resistances 36 and 37. The current from the battery E divides between the two branches, one including the resistances 33, $r$ and 34 and the other including the resistances 35, 36 and 37. The current in the branch including resistances 35, 36 and 37 is kept at a constant value by suitably adjusting the rheostat 24 to such position that the fall of potential across the resistance coil 36 due to the current from source E balances or is equal to the electro-motive-force of the standard cell 17, which condition is observed by pressing the key 25 into engagement with contact 15 and so adjusting the rheostat 24 that the galvanometer 12 indicates no current. Since the current in the branch including resistances 35, 36 and 37 is constant in value, the current in the branch including the slide wire $r$ will also be of constant value provided the ratio of the resistances of the two branches is constant. The resistance 35 consists of a wire or conductor of nickel or other suitable material having a large positive temperature co-efficient and is located near the cold junction of the thermo-couple so as to partake of the temperature of the cold junction. For this purpose the resistance 35 may in many cases be located within or at the reading instrument because the cold junction is at or within the instrument. This is particularly the case when employing a base metal couple whose connections to the instrument are made through wires of the same materials as the couple materials. The resistances 33, $r$, 34, 36 and 37 consist of conductors or wires of manganin or other suitable material preferably having a negligibly small temperature co-efficient. The values of the resistances are so chosen that changes in the electro-motive-force produced by the thermo-couple due to changes in temperature of the cold junction are balanced or compensated for by corresponding changes in the fall of potential across resistance 35. With a change in temperature of the cold junction, and therefore of resistance 35, the resistance value of 35 changes and therefore the drop of potential across it changes, and this change in drop of potential across resistance 35 balances or compensates for the change in electro-motive-force of the thermo-couple due to a change in temperature in its cold junction. In other words, in taking a temperature reading, with the key 25 in engagement with contact 10, the contact 8 is moved along the slide wire $r$ until the galvanometer 12 indicates no current. If the cold junction is at a temperature other than calibration temperature the effect of resistance 35 is to cause the operator to move contact 8 in procuring a balance to such point along the resistance $r$ that there is read opposite the contact 8 upon the scale $a$ a temperature or electro-motive-force which is the true temperature of the hot junction or the electro-motive-force that would be produced by the thermo-couple if the cold junction were at calibration temperature. The value of the resistance 33 is so chosen that the scale $a$ starts at 0 or at any other desired temperature of electro-motive-force.

Let

R = resistance of compensating resistance 35 at reference temperature.
$c$ = change in the electro-motive-force of the thermo-couple per degree change in temperature of the cold junction with the hot junction at a given temperature.
$k$ = temperature co-efficient of material of coil 35 per ohm per degree.
$t$ = temperature change of cold junction.
$i$ = current strength in the branch including resistance 35.
$e$ = change in electro-motive-force of the thermo-couple due to temperature change $t$ of the cold junction.
$e^1$ = change in fall of potential across resistance 35 due to temperature change $t$ of the cold junction.

$e$ must be made equal to $e^1$.
$e = ct$. (1)
$e^1 = Rkti$, (2)

from which we have $Rkti = ct$. (3)

$R = \dfrac{c}{ki}$ (4)

Therefore the resistance 35 is made equal to the constant quantity $\dfrac{c}{ki}$, and $e$ equals $e^1$ regardless of changes in temperature of the cold junction.

The combined resistance of 36 and 37 is chosen high as compared to the value of resistance 35, in order that the ratio of the resistances in the two branches remains practically constant irrespective of changes in value of resistance 35, and consequently the current strength in the branch including slide wire $r$ will remain practically constant.

In Fig. 3 is shown an arrangement similar to that of Fig. 2 with additional means for maintaining the relation of current strength in the branch including the slide wire $r$ with respect to the current strength in the other branch absolutely constant regardless of changes in value of resistance 35. In this figure the parts are similar to those of Fig. 2 except that the resistance 37 of Fig. 2 is omitted and in the branch including the slide wire $r$ is included the additional resistance 39 of a wire or conductor having the same temperature co-efficient as the material of resistance 35. The resistances 35 and 39 are both subjected to the temperature of the cold junction of the thermo-couple. The ratio of resistance 39 to the total resistance in its branch must be the same as the ratio of resistance 35 to the total resistance in its branch.

In Fig. 4 is shown a diagram of connections for a double range instrument for use with thermo-couples of different types, for example base metal and noble metal thermo-couples, but, generally speaking, for use with thermo-couples whose calibration curves are different. When using one type of thermo-couple, for example a base metal couple, a plug is inserted in the hole 40, thus short circuiting the resistance 41. The conditions are then similar to those of Fig. 2. When another type of thermo-couple, for example a noble metal couple is used, the plug is removed from hole 40 and inserted in hole 42, thus shunting the slide wire $r$ with the resistance 43 and bringing the resistance 41 into series with the slide wire $r$. A plug is also inserted in hole 44, thus shunting resistance 33 with resistance 45; and a plug is inserted in hole 46, thus shunting the resistance 35 with a resistance 47 of material having preferably the same temperature co-efficient as the resistance 35 and subjected therewith to the temperature of the cold junction. The resistance 41 has such value that the total resistance in the branch including the resistance $r$ for the second range is equal to the resistance of the other branch for the second range.

In Fig. 5 is shown diagrammatically an arrangement for use when the material of the leads or wires connecting the thermo-junction with the potentiometer instrument is unlike one or both materials of the thermo-junction. In this case the hot junction T, for example of noble metals such as platinum and platinum-rhodium, is at a distance from the reading instrument and is connected to the binding posts 26 and 27 of the instrument by conductors or leads 48 and 49, for example of copper, extending to the terminals 50 and 51 of the junction T. The cold junction in this case is at the terminals 50, 51 of the junction T. The compensating resistance 35 in such case must be placed near and subjected to the temperature of the cold junction. For this purpose the instrument is provided with the additional binding posts 52, 53 and 54 connected respectively with the source E, the potentiometer branch including the slide wire $r$, and the second potentiometer branch. The binding posts 52 and 53 are connected with one terminal of the resistance 35 by the conductors 55 and 56 while the post 54 is connected with the remaining terminal of the resistance 35 by the conductor 57. These conductors 55, 56 and 57 are all preferably of the same material, for example copper, and 56 and 57 are of the same resistance. The lead or conductor 56 is thus in series with the first branch and the lead or conductor 57 is in series with the second branch of the potentiometer. By making the current strengths in these two branches equal, the current strengths in the leads 56 and 57 are equal and consequently the fall of potential in the lead 56 compensates for the drop of potential in the lead 57.

In Fig. 6 there is shown an arrangement for a double range instrument for use with thermo-couples of different types or characteristics, in which for one range an automatic compensator for changes in cold junction temperature is provided and for the other range a second slide wire or manual compensator is provided. For the first range the automatic compensating resistance 35 is in circuit, the slide wire $r'$ and resistance 58 are short circuited by placing a plug in hole 59, and resistance 41 is short circuited by placing a plug in hole 40. The operation is then that described in connection with Fig. 2 or one range of Fig. 4. For the other range the plug is removed from hole 59 and inserted in hole 60, thus short circuiting resistance 35 and bringing into the second branch the slide wire $r'$ and resistance 58; and in the first branch the plug is removed from hole 40 and inserted in hole 42, introducing resistance 41 into that branch and shunting the slide wire $r$ with resistance 43, and a plug is inserted in hole 44 thus shunting the resistance 33 with the resistance 45. In using the apparatus for the second range contact 13 is moved on slide wire $r'$ to a point on the correction scale $d$ corresponding with the temperature of the cold junction. Then the contact 8 is moved along the slide wire $r$ until a balance is obtained with key 25 in engagement with contact 10.

Fig. 7 shows an arrangement similar to that of Fig. 2 except that the standard cell 17 is adapted to be connected across the points where the current divides in the two potentiometer branches instead of being connected, as in Fig. 2, across the resistance 36.

When the key 25 is pressed into engagement with contact 15, a plug is inserted in hole 61, thus connecting the standard cell terminals to the extreme ends of the branches, whereupon the rheostat 24 is adjusted as before until the galvanometer 12 shows no current.

For making a temperature reading the key 25 is pressed into engagement with contact 10, and the plug is removed from the hole 61 and inserted in hole 62. Then the switch arm $8^a$ is moved over the contact studs between which are connected the resistance sections $r^2$ until an approximate balance is indicated by the galvanometer 12; then the contact 13 is moved over the slide wire $r'$ in the other branch until a true balance is obtained. Then an electro-motive-force value is read opposite the stud on which the switch arm $8^a$ is in contact and to such value is added the value of electro-motive-force read upon the scale $d$ opposite the pointer movable with the contact 13. This gives the total electro-motive-force generated by the thermo-couple connected to the posts 26 and 27, the nickel or like resistances 35 and 39 automatically compensating for changes in temperature in cold junction of the thermo-couple. From a curve, similar to that in Fig. 1, may be read off the corresponding temperature of the hot junction of the thermo-couple.

In Fig. 8 is shown a simple potentiometer arrangement in which the current strength through the slide wire $r$, resistance 63, and resistance 64 is adjusted to proper value by pressing the key 25 into engagement with contact 15 and adjusting the rheostat 24 until the galvanometer 12 indicates no current. The resistance 63 has a negative temperature coefficient, that is, is of such material that as its temperature rises its resistance falls, being in this respect opposite to the hereinbefore described resistances 35 which have positive temperature co-efficients. The resistance 63 is subjected to the temperature of the cold junction, and as such temperature varies the resistance 63 varies in value and automatically compensates for changes in temperature of the cold junction. A suitable material for resistance 63 is carbon, though any other suitable material of negative temperature co-efficient may be employed. The resistances 64 and $r$, as in the previous cases, are preferably of manganin or other suitable material having negligible temperature co-efficient.

While I have herein used the term "slide wire" for the adjustable resistances $r$ and $r'$, it will be understood that such term includes any type of adjustable resistance whether constructed as a slide wire or otherwise.

This application is a division from my prior application Serial Number 11,945, filed March 4, 1915.

What I claim is:

1. The combination with a thermo-couple, of a reading instrument comprising a potentiometer, a slide wire resistance in the circuit of said potentiometer, a scale associated therewith, a contact movable with respect to said scale in engagement with said slide wire, a compensating resistance in the potentiometer circuit subjected to the temperature of the cold junction of said thermo-couple, said resistance having a temperature co-efficient such that the fall of potential across said resistance compensates for variation in the electro-motive-force of said thermo-couple due to change of temperature of the cold junction of said thermo-couple from calibration temperature.

2. The combination with a thermo-couple, of a reading instrument associated therewith comprising a potentiometer, a slide wire resistance in the circuit of said potentiometer, a scale associated therewith, a contact movable with respect to said scale in engagement with said slide wire resistance, a compensating resistance in the circuit of said potentiometer subjected to the temperature of the cold junction of said thermo-couple, said resistance having a temperature co-efficient great with respect to the other resistance of the potentiometer circuit, the fall of potential across said resistance compensating for the variation in the electro-motive-force of said thermo-couple due to change of temperature of the cold junction of said thermo-couple from the calibration temperature.

3. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a temperature co-efficient such that the fall of potential across said resistance compensates for effects of variation of the cold junction of said thermo-couple from calibration temperature.

4. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a temperature co-efficient such that the fall of potential across said resistance compensates for effects of variation of the cold junction of said thermo-couple from calibration temperature, and additional resistance in said second named branch great compared with said compensating resistance.

5. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a positive temperature co-efficient such that the fall of potential across said resistance compensates for effects of variation of the cold junction of said thermo-couple from calibration temperature.

6. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a resistance in another circuit branch subjected to the temperature of the cold junction of said thermo-couple, said resistance having a positive temperature co-efficient such that the fall of potential across said resistance compensates for effects of variation of the cold junction of said thermo-couple from calibration temperature, and additional resistance in said second named branch great compared with said compensating resistance.

7. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a temperature co-efficient such that the fall of potential across said resistance compensates for effects of variation of the cold junction of said thermo-couple from calibration temperature, and a resistance having similar temperature co-efficient in series with said slide wire resistance in said first named branch.

8. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a temperature co-efficient such that the fall of potential across said resistance compensates for effects of variation of the cold junction of said thermo-couple from calibration temperature, additional resistance in said second named branch great compared with said compensating resistance, and a resistance having similar temperature co-efficient in series with said slide wire resistance in said first named branch.

9. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a positive temperature co-efficient such that the fall of potential across said resistance compensates for effects of variation of the cold junction of said thermo-couple from calibration temperature, and a resistance having similar temperature co-efficient in series with said slide wire resistance in said first named branch.

10. The combination with a thermo-couple, of a reading instrument associated therewith comprising a split circuit potentiometer, a slide wire resistance in one of the circuit branches of said potentiometer, a scale associated with said slide wire resistance, a contact movable with respect to said scale on said slide wire resistance, a compensating resistance in another circuit branch subjected to the temperature of the cold junction of said thermo-couple, said resistance having a positive temperature co-efficient such that the fall of potential across said resistance compensates for effects of variation of the cold junction of said thermo-couple from calibration temperature, additional resistance in said second named branch great compared with said compensating resistance, and a resistance having similar temperature co-efficient in series with said slide wire resistance in said first named branch.

11. The combination with a thermo-couple, of a reading instrument comprising a split circuit potentiometer, a slide wire resistance in one circuit branch of said potentiometer, a scale associated therewith, a contact movable with respect to said scale along said slide wire resistance, a compensating resistance in another circuit branch subjected to the temperature of the cold junction of said thermo-couple, said resistance having such temperature co-efficient and magnitude as to compensate for effects of variations in temperature of said cold junction from calibration temperature, a lead in each of said circuit branches extending to the terminals of said resistance, a third lead connecting with one terminal of said resistance, and a source of energy connected in circuit with said third lead and said circuit branches.

12. The combination with a thermo-couple, of a reading instrument comprising a split circuit potentiometer, a slide wire resistance in one circuit branch of said potentiometer, a scale associated therewith, a contact movable with respect to said scale along said slide wire resistance, a compensating resistance in another circuit branch subjected to the temperature of the cold junction of said thermo-couple, said resistance having such temperature co-efficient and magnitude as to compensate for effects of variations in temperature of said cold junction from calibration temperature, a lead in each of said circuit branches extending to the terminals of said resistance, said leads having equal resistances, a third lead connecting with one terminal of said resistance, and a source of energy connected in circuit with said third lead and said circuit branches.

13. The combination with an instrument comprising a split circuit potentiometer, of a thermo-couple disposed at a distance from said instrument, leads from said thermo-couple to said instrument of materials different from the materials of the thermo-couple, a slide wire resistance in a circuit branch of said potentiometer, a scale associated therewith, a contact movable with respect to said scale along said slide wire resistance, a compensating resistance in another circuit branch subjected to the temperature at the junction between said leads and said thermo-couple, leads in said circuit branches connected to the terminals of said compensating resistance, said resistance having a magnitude and temperature co-efficient such that it compensates for effects of variations in temperature of the cold junction of said thermo-couple, a third lead connected to one terminal of said resistance, and a source of current in circuit with said third lead and said circuit branches.

14. The combination with an instrument comprising a split circuit potentiometer, of a thermo-couple disposed at a distance from said instrument, leads from said thermo-couple to said instrument of materials different from the materials of the thermo-couple, a slide wire resistance in a circuit branch of said potentiometer, a scale associated therewith, a contact movable with respect to said scale along said slide wire resistance, a compensating resistance in another circuit branch subjected to the temperature at the junction between said leads and said thermo-couple, leads in said circuit branches connected to the terminals of said resistance, said leads having equal resistances, said compensating resistance having a temperature co-efficient and magnitude such that it compensates for effects of variations in temperature of the cold junction of said thermo-couple, a third lead connected to one terminal of said resistance, and a source of current in said circuit with said third lead and said circuit branches.

15. The combination with a thermo-couple, of a plural range reading instrument comprising a split circuit potentiometer, a slide wire resistance in a circuit branch of said potentiometer, a scale associated therewith, a contact movable with respect to said scale along said slide wire resistance, a compensating resistance in another circuit branch subjected to the temperature of the cold junction of said thermo-couple, said resistance having such magnitude and temperature co-efficient that it compensates for effects of variation in temperature of said cold junction from calibration temperature, means for changing the range of said instrument comprising a resistance in series with said slide wire resistance in said first named branch, a resistance in shunt to said slide wire resistance, and a resistance in shunt with said compensating resistance, said last named resistance having a temperature co-efficient similar to said compensating resistance.

16. The combination with a thermo-couple, of a plural range reading instrument comprising a split circuit potentiometer, a slide wire resistance in a circuit branch of said potentiometer, a scale associated therewith, a contact movable with respect to said scale along said slide wire resistance, a compensating resistance in another circuit branch subjected to the temperature of the cold junction of said thermo-couple, said resistance having such magnitude and temperature co-efficient that it compensates for effects of variation in temperature of said cold junction from calibration temperature, means for changing the range of said instrument comprising a resistance in series with said slide wire resistance in said first named branch, a resistance in shunt to said slide wire resistance, a resistance in shunt to said compensating resistance, said last named resistance having a temperature co-efficient similar to said compensating resistance, a further resistance in said first named branch, and a resistance adapted to be connected in shunt therewith.

17. The combination with a thermo-couple of a plural range reading instrument comprising a split circuit potentiometer, a slide wire resistance in one circuit branch, a scale associated therewith, a contact movable with respect to said scale along said slide wire resistance, a slide wire resistance in another circuit branch, a correction scale associated therewith, a contact movable with respect to said correction scale along said second named slide wire resistance, and means for changing the range of said instrument comprising means for short circuiting said second named slide wire resistance, means for bringing into said second named circuit branch a compensating resistance subjected to the temperature of the cold junction of said thermo-couple, said resistance having such magnitude and temperature co-efficient as to compensate for effects of variations in temperature of said cold junction from calibration temperature.

18. A plural range reading instrument comprising a split circuit potentiometer, slide wire resistances in different circuit branches, main and correction scales associated with said slide wire resistances, a thermo-couple, contacts connected therewith movable with respect to said scales along said slide wire resistances, a compensating resistance in the circuit branch including the slide wire resistance associated with said correction scale, said resistance subjected to the temperature of the cold junction of said thermo-couple and having a temperature co-efficient and magnitude such as to compensate for effects of variations in temperature of said cold junction from calibration temperature, and means for rendering inoperative either said compensating resistance or the slide wire resistance in the same circuit branch therewith.

19. The combination with a thermo-couple, of a reading instrument associated therewith comprising a split circuit potentiometer, a stepped resistance in one of said branch circuits, a contact for engaging said resistance, a slide wire resistance in another branch circuit, a scale associated with said slide wire resistance, a contact movable with respect to said scale along said slide wire resistance, a resistance in the same branch circuit with said slide wire resistance subjected to the temperature of the cold junction of said thermo-couple, the readings of said scale adding to the readings of the steps of said stepped resistance giving a reading of electro-motive-force produced by said thermo-couple.

20. The combination with a thermo-couple, of a reading instrument associated therewith comprising a split circuit potentiometer, a stepped resistance in one of said branch circuits, a contact for engaging said resistance, a slide wire resistance in another branch circuit, a scale associated with said slide wire resistance, a contact movable with respect to said scale along said slide wire resistance, a resistance in the same branch circuit with said slide wire resistance subjected to the temperature of the cold junction of said thermo-couple, the readings of said scale added to the readings of the steps of said stepped resistance giving a reading of electro-motive-force produced by said thermo-couple, and a resistance in the first named branch circuit having a temperature co-efficient similar to that of said compensating resistance in the second branch circuit.

21. The combination with a thermo-couple, of a reading instrument comprising a potentiometer, a resistance in the circuit of said potentiometer, a contact movable with respect to said resistance and connected with a junction of said thermo-couple, and a compensating resistance in the potentiometer circuit subjected to the temperature of the cold junction of said thermo-couple, said resistance having a temperature co-efficient such that said resistance compensates for variation in temperature of the cold junction of said thermo-couple.

22. The combination with a thermo-couple, of a second source of current, a circuit including said second source of current, an indicating instrument and connections with said thermo-couple for balancing the electro-motive-force of said thermo-couple against an electro-motive-force produced by current from said second source of current, and a resistance in the circuit of said second source of current changing in magnitude automatically with changes in temperature of the cold junction of said thermo-couple for compensating for the variation in temperature of the cold junction of said thermo-couple.

23. The combination with a thermo-couple, of a second source of current, a circuit including said second source of current, an indicating instrument and connections with said thermo-couple for balancing the electro-motive-force of said thermo-couple against an electro-motive-force produced by current from said second source of current, a resistance in the circuit of said second source of current changing in magnitude automatically with changes in temperature of the cold junction of said thermo-couple for compensating for the variation in temperature of the cold junction of said thermo-couple, and a variable resistance in the circuit of said second source of current for determining the strength of current flowing from said second source.

24. The combination with a thermo-couple, of a second source of current, a circuit including said second source of current, an indicating instrument and connections with said thermo-couple for balancing the electro-motive-force of said thermo-couple against an electro-motive-force produced by current from said second source of current, a resistance in the circuit of said second source of current changing in magnitude automatically with changes in temperature of the cold junction of said thermo-couple for compensating for the variation in temperature of the cold junction of said thermo-couple, and means for predetermining the strength of current flowing from said second source of current.

25. The combination with a thermo-couple, of a reading instrument comprising a split circuit potentiometer, connections from said thermo-couple to different branches of said potentiometer, and a resistance in one of said potentiometer branches subjected to the temperature of the cold junction of said thermo-couple and having a temperature coefficient such that said resistance automatically compensates for variation of temperature of said cold junction of said thermo-couple.

26. The combination with a split circuit potentiometer comprising branches connected in parallel with each other and in series with a source of current, of a thermo-couple, a connection from said thermo-couple to one of said branches, a second connection from said thermo-couple to and variable along another of said branches, and a resistance in one of said branches changing in resistance with changes in temperature of the cold junction of said thermo-couple for compensating for variation of temperature of the cold junction of said thermo-couple.

27. The combination with a split circuit potentiometer comprising branches connected in parallel with each other and in series with a source of current, of a thermo-couple, a connection from said thermo-couple to one of said branches, a second connection from said thermo-couple to and variable along another of said branches, and a resistance in each of a plurality of said branches changing in resistance with changes in temperature of the cold junction of said thermo-couple for compensating for variation of temperature of said cold junction of said thermo-couple.

28. The combination with a thermo-couple, of a reading instrument comprising a split circuit potentiometer, connections from said thermo-couple to different branches of said potentiometer, and a resistance in each of a plurality of branches of said potentiometer subjected to the temperature of the cold junction of said thermo-couple, said resistances having similar temperature co-efficients such that said resistances automatically compensate for variation of temperature of the cold junction of said thermo-couple.

29. The combination with a thermo-couple, of a reading instrument comprising a split circuit potentiometer, connections from said thermo-couple to different branches of said potentiometer, a resistance in each of a plurality of branches of said potentiometer subjected to the temperature of the cold junction of said thermo-couple, said resistances having similar temperature co-efficients such that said resistances automatically compensate for variation of temperature of the cold junction of said thermo-couple, and an additional resistance in circuit with one of said resistances in one of said branches.

30. The combination with a thermo-couple, of a reading instrument comprising a split circuit potentiometer, connections from said thermo-couple to different branches of said potentiometer, a resistance in each of a plurality of branches of said potentiometer subjected to the temperature of the cold junction of said thermo-couple, said resistances having similar temperature co-efficients such that said resistances automatically compensate for variation of temperature of the cold junction of said thermo-couple, and an additional resistance in circuit with each of said resistances in their respective branches.

31. The combination with a thermo-couple, of a reading instrument comprising a split circuit potentiometer, a resistance in one of said branches subjected to the temperature of the cold junction of said thermo-couple and varying in resistance with variation in temperature, and an additional resistance in circuit with said resistance in said one of said branches.

32. The combination with a thermo-couple, of a reading instrument comprising a potentiometer, a resistance in the circuit of said potentiometer, a contact movable with respect to said resistance and connected with a junction of said thermo-couple, a second connection from a junction of said thermo-couple to said potentiometer, a galvanometer connected in said second connection, and a resistance in the circuit of said potentiometer subjected to the temperature of the cold junction of said thermo-couple and changing in magnitude with change in temperature for automatically compensating for variation of temperature of said cold junction of said thermo-couple.

33. The combination with a thermo-couple, of a reading instrument comprising a split circuit potentiometer, a resistance in one branch of said potentiometer, a contact movable with respect to said resistance and connected with a junction of said thermo-couple, a second connection from a junction of said thermo-couple to another branch of said potentiometer, a galvanometer connected in said second connection, and a resistance subjected to the temperature of the cold junction of said thermo-couple varying in magnitude with variation of temperature for automatically compensating for variation of temperature of said cold junction of said thermo-couple.

34. The combination with a thermo-couple, of a reading instrument comprising a split circuit potentiometer, a resistance in one branch of said potentiometer, a contact movable with respect to said resistance and connected with a junction of said thermo-couple, a second connection from a junction of said thermo-couple to another branch of said potentiometer, a galvanometer connected in said second connection, a resistance subjected to the temperature of the cold junction of said thermo-couple varying in magnitude with variation of temperature for automatically compensating for variation of temperature of said cold junction of said thermo-couple, and another resistance connected in said second branch.

35. The combination with a thermo-couple, of a reading instrument comprising a split circuit potentiometer, a resistance in one branch of said potentiometer, a contact movable with respect to said resistance and connected with a junction of said thermo-couple, a second connection from a junction of said thermo-couple to another branch of said potentiometer, a galvanometer connected in said second connection, a resistance subjected to the temperature of the cold junction of said thermo-couple varying in magnitude with variation of temperature for automatically compensating for variation of temperature of said cold junction of said thermo-couple, and another resistance connected in said second branch, said second connection to said second branch being made at a point between said resistances in said second branch.

36. The combination with a split circuit potentiometer comprising branches connected in parallel with each other and in series with a source of current, of a thermo-couple, a connection from said thermo-couple to one of said branches, a second connection from said thermo-couple to and variable along another of said branches, a resistance in one of said branches changing in resistance with changes in temperature of the cold junction of said thermo-couple for compensating for variation of temperature of the cold junction of said thermo-couple, and a variable resistance in series with said source of current and said branches for determining the strength of current delivered by said source of current.

In testimony whereof I have hereunto affixed my signature this 10" day of August, 1915.

FELIX WUNSCH.